United States Patent [19]

Fox et al.

[11] Patent Number: 5,410,894
[45] Date of Patent: May 2, 1995

[54] GLADHAND SECURITY LOCK APPARATUS

[75] Inventors: Robert Fox, Wilmington; Gary Rose, Anaheim; Don Shirley, La Mirada, all of Calif.

[73] Assignee: Norco Industries, Inc., Compton, Calif.

[21] Appl. No.: 173,119

[22] Filed: Dec. 27, 1993

[51] Int. Cl.⁶ ............................................. B60R 25/00
[52] U.S. Cl. .......................................... 70/14; 70/57; 70/163; 70/168; 70/237; 70/416; 138/89; 280/420; 285/80
[58] Field of Search ............... 70/14, 57, 416, 237, 70/163, 166–173, 379 R, 379 A; 285/69, 73, 76–80; 280/507, 420, 421; 138/89

[56] References Cited

U.S. PATENT DOCUMENTS

| | | |
|---|---|---|
| 1,125,791 | 1/1915 | Aston ............................. 70/379 R |
| 1,619,464 | 3/1957 | Eichhorn . |
| 3,052,489 | 9/1965 | Stoudt . |
| 3,269,159 | 8/1966 | Young ............................. 280/507 |
| 3,892,431 | 7/1975 | Booth .............................. 285/79 |
| 4,226,103 | 10/1980 | Strickland ....................... 70/237 |
| 4,325,237 | 4/1982 | Menzie .............................. 70/14 |
| 4,362,035 | 12/1982 | Vitale ........................... 70/416 X |
| 4,693,096 | 9/1987 | Mercer .............................. 70/14 |
| 4,747,623 | 5/1988 | Newcomb et al. ................ 285/69 |
| 5,129,243 | 7/1992 | Kassebaum ........................ 70/14 |

Primary Examiner—Lloyd A. Gall
Attorney, Agent, or Firm—Fulwider, Patton, Lee & Utecht

[57] ABSTRACT

An improved gladhand security lock apparatus is locked to a gladhand brake line coupler to immobilize a trailer. The body of the security lock apparatus is formed with an abutment surface from which depends a clevis wall and a retainer turned back from the clevis wall and spaced from the abutment surface forming a tongue receiving bight. A guard plate is formed on an end of the body and a clip with an upturned rail member is formed parallel to the guard plate and spaced therefrom. The security lock apparatus is attached to the gladhand coupler so that a tongue of the gladhand is received in the tongue receiving bight, the abutment surface of the security lock apparatus overlies a port of the gladhand coupler, and a retainer flange formed on the gladhand coupler is received between the guard plate and the clip. The security lock apparatus body comprises a barrel. A lock housing is formed in a bore in the barrel perpendicular to and confronting a keeper bolt positioned in a keeper bolt receiving bore. A lock cylinder in the lock housing is operative to drive the keeper bolt across the tongue receiving bight from an opening in the abutment surface to engage the retainer. In operation, the tongue of the gladhand coupler is inserted in the tongue receiving bight and a user drives and locks the keeper bolt against the retainer thereby locking the tongue of the gladhand into the security lock apparatus.

16 Claims, 2 Drawing Sheets

GLADHAND SECURITY LOCK APPARATUS

BACKGROUND OF THE INVENTION

1. Field of the Invention

The present invention relates to a new and improved gladhand security lock apparatus and particularly a better bolt mechanism for such an apparatus.

2. Description of Related Art

In the trucking industry, tractors and trailers can be interchanged as modular units. A fleet of tractor cabs and a fleet of tractor trailers can be used interchangeably. To facilitate interchangability, the hitches for the tractors and trailers are standardized. Tractor trailers are generally compatible with most trailers. Loaded trailers are vulnerable to unauthorized tractor drivers hitching their tractors to the trailer and taking possession of the trailer with its valuable contents. This presents a security problem for the trucking industry.

As a result, devices have been invented to discourage theft of tractor trailers. Some devices prevent theft by denying access to trailer brake line couplings called gladhands.

Tractor trailers employ an air brake system having a coupling mechanism known as a gladhand. The gladhands are employed to couple air pressure from the tractor to the brake line of the trailer to be towed.

When the gladhand is disconnected from the cab air line, air pressure is released thus locking the trailer brakes. The wheels cannot be unlocked unless a brake hose coupling is attached to the gladhand. Various locking mechanisms have been proposed to lock trailer gladhands against coupling to an unauthorized tractor.

The contents of the trailers are often valuable enough to render the trailers a continued target of persistent, sophisticated thieves. If a locking device embodies a weakness in only one aspect of its design, the whole device is limited. Locking devices need therefore be more than a superficial deterrent.

U.S. Pat. No. 4,226,103 shows a gladhand locking device which is brought into engagement with the gladhand from a diametrical direction. Once engaged, a locking pin is urged down into a central air passage opening of the gladhand to maintain the engagement. The effectiveness of the locking device is dependant upon the inner diameter of the air passage and subjects the inner wall of such air passage to damage. It cannot be used with gladhands having a screen across the air passage opening or with those incorporating a spider blocking access thereto from a radial direction.

U.S. Pat. No. 4,325,237 describes a lock plug for a gladhand brake line coupler. The lock plug inserts into the air passage opening and its effectiveness is therefore limited to only those devices having compatible internal dimensions.

A brake line coupler lock having a post that is inserted into the brake line air passage is shown in U.S. Pat. No. 4,693,096. The post is connected to a metal retaining bracket that has two downwardly disposed arms that wrap around the brake hand. At the extremities of the arms are holes. A lock may be attached through the holes. The lock bar of the '096 device can be cut with a hacksaw, wire cutters, or bolt cutters. The retaining bracket can be cut by heavy-duty metal cutters.

U.S. Pat. No. 5,129,243 assigned to the assignee of the present application shows a sturdy cast iron locking device that is rotatably attached to the gladhand in the same manner that the brake line air coupling from the cab is attached to a gladhand. A shortcoming of this device is that it relies on a plunger which is in practice unfortunately exposed to the point where access can be had thereto by an unauthorized individual so it could be hacksawed into thereby releasing the brake.

It is therefore an object of this invention to make an improved gladhand security lock apparatus the effectiveness of which is not dependant on the size of the gladhand air passage.

It is another object of this invention to make a lock apparatus that can be used with virtually all gladhands and which will deter unauthorized severance of the locking plunger thereby discouraging removal.

Thus it is an object of this invention to make a gladhand lock apparatus using a locking mechanism that is more difficult to pry open or saw through.

SUMMARY OF THE INVENTION

The gladhand security lock of the present invention is characterized by a body formed with an abutment surface facing in one direction to overlie the port face of a gladhand and includes a clevis wall projecting outwardly in such one direction and turned back to underlie a flange on the gladhand and formed on one end with an abutment skirt for limiting rotation relative to such flange. The turned back retainer is formed with a recess aligned at the opposite end of the gladhand tongue for receipt of a saw resistant keeper bolt telescoped through the body and reciprocally engageable therewith to selectively capture such tongue between such keeper bolt and the abutment skirt to thereby lock such body in place relative to the gladhand. A lock is provided in the housing and floatingly engages the keeper bolt to, upon rotation thereof in one direction, advance such bolt into its retaining position while leaving such bolt free to rotate about its own axis such that tangential engagement of, for instance, hacksaw teeth with the surface thereof will result in such bolt rotating about its own axis thereby preventing relative movement between such teeth and the bolt to thus prevent such teeth from extracting material from such bolt to sever same.

Other objects and features of the invention will become apparent from consideration of the following description taken in conjunction with the accompanying drawings.

DESCRIPTION OF THE PREFERRED EMBODIMENT

Figure 1:
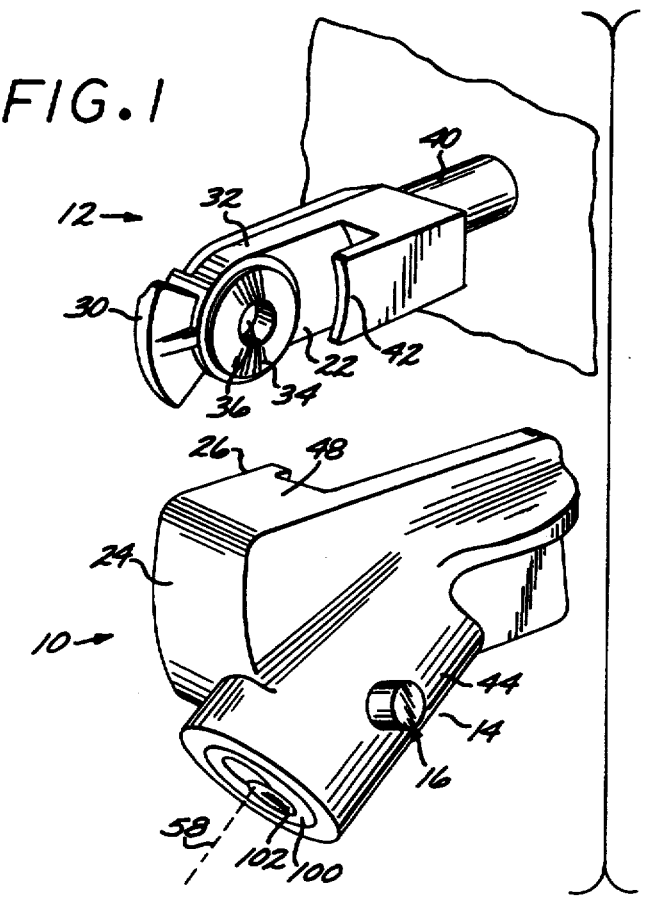
FIG. 1 is a side view of the gladhand security lock apparatus and a gladhand coupler protruding from a trailer.

As shown in the drawings for purposes of illustration, the invention is embodied in a gladhand security lock apparatus 10 for protecting and securing a gladhand coupler 12 of the type conventionally mounted on a tractor trailer. A mating coupler is typically carried on a tractor to be connected to the gladhand coupler for communication of pressurized air to release the brakes of the trailer for movement thereof.

Figure 2:
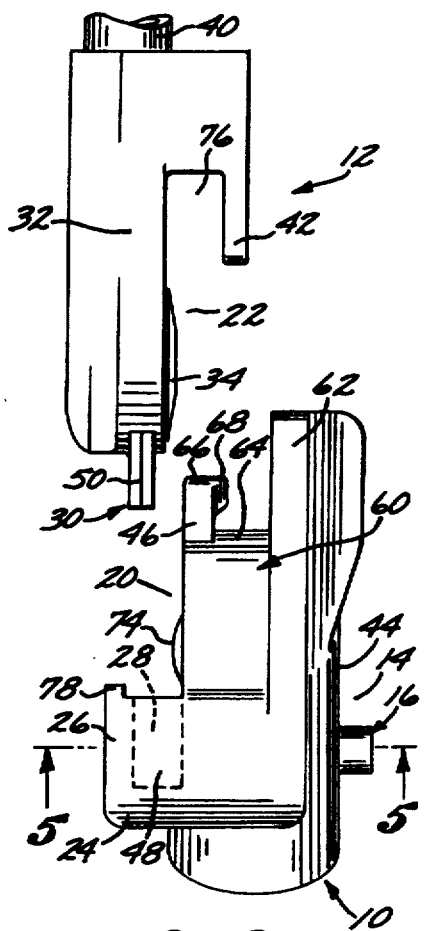
FIG. 2 is a top view of the gladhand and the gladhand security locking apparatus prior to engagement.

In accordance with the present invention, a gladhand security lock apparatus 10 comprises, generally, a body 14, and a saw resistant bolt 16 (FIG. 1) telescopically movable in a transceiver bore 18 (FIGS. 5 and 6) through the body and freely rotatable within such bore. An abutment surface 20 is formed on one side of the body to overlie a port face 22 of the gladhand (FIG. 2). A clevis wall 24 is formed extending outwardly from said abutment surface. The clevis wall is turned back parallel to the abutment surface to form a retainer 26. The abutment surface, the clevis wall, and the retainer cooperate to form a tongue receiving bight 28. Locking the bolt into contact with the retainer captures a tongue 30 formed from an annular flange shaped segment of the gladhand 12 disposed within the tongue receiving bight 28 to be held captive on such gladhand to block unauthorized access.

The gladhand security lock apparatus 10 of the present invention attaches around a brake line gladhand to prevent access thereto for releasing the trailer brakes. Referring to FIG. 1, a gladhand coupler 12 to which the lock apparatus of the present invention may be applied, includes an elongated body 32 mounting a gasket 34 defining a central port 36 acting as an air passage which may be connected with an air hose 40 leading to a trailer brake actuator. Typically such couplers incorporate a fan shaped annular flange segment defining the tongue 30 projecting longitudinally from one end and a spaced overhanging retaining flange 42 projecting parallel in spaced relation thereto (FIG. 2). The gladhand security locking apparatus of the present invention includes, generally, a lock body 14, a cylindrically shaped hand grasp barrel 44 formed with the axially facing generally flat abutment surface 20 facing toward the gladhand gasket 34 and a fan shaped clip 46 (FIGS. 2 and 3) projecting in one radial direction to engage under the overhanging flange 42. Projecting axially from the diametrical opposite side of the central portion of such housing is the arcuate clevis wall 24 carrying the arcuate retainer flange 26 to extend back over, but spaced from, the abutment surface 20 and cooperate with such surface to form the bight 28. A radial abutment skirt 48 (FIGS. 2 and 4) is formed at one end of the clevis arm 24 to abut one side 50 of the tongue 30 and block access thereto. Referring to FIG. 4, the abutment skirt 48 closes the first side of the tongue receiving bight against which the tongue's first end 50 rests when the gladhand 12 is engaged into the gladhand locking body 14. The retainer 26 terminates in a keeper pad 52 (FIGS. 5 and 6) disposed at the side of the tongue opposite the abutment surface in alignment with the keeper bolt. The keeper pad is inwardly tapered towards the clevis wall 24 to be compatible with the dimensions of the gladhand tongue. The keeper bolt 16 is floatably driven by a lock, generally designated 54 (FIG. 7) to be driven into a locked position against such pad as shown in FIG. 6, but to remain free for rotation about its longitudinal axis 56 so that drawing of the teeth of a hacksaw blade over the peripheral surface thereof during the power stroke will not be resisted so that purchase will not be had for relative movement as is normally required for saw tooth cutting of metal.

Referring to FIG. 2, the security lock apparatus may be of cast or molded construction and is preferably constructed of cast metal. The main portion of the body is of cylinder shape flattened on one side to form the abutment surface 20.

Figure 3:
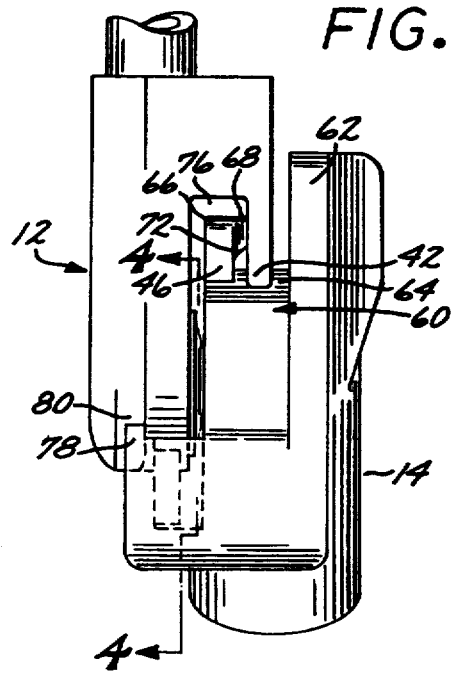
FIG. 3 is a top view of the gladhand locking apparatus fully engaged onto the gladhand of a trailer.
Figure 4:
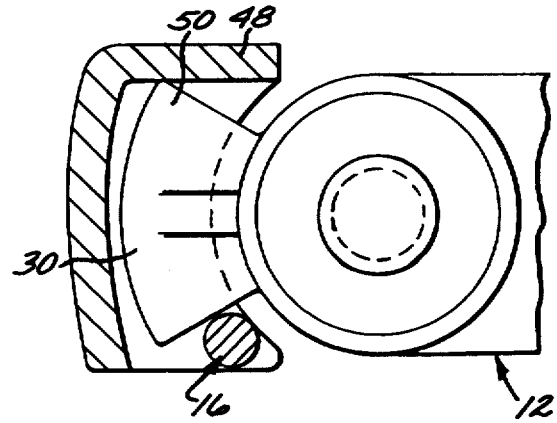
FIG. 4 is an enlarged sectional view of the gladhand in locked position with the gladhand tongue received into the tongue receiving bight taken along line 4—4 of FIG. 3.

An elongated closure housing, generally designated 60, projects at an angle of about 20° to the axis 58 (FIG. 1) of the cylindrical body and is formed at one extremity with a planar guard plate 62 (FIG. 2) located at one end of such cylindrical housing and, in the assembled configuration shown in FIG. 3, overlies the gladhand retainer flange 42 to block access thereto by a pry tool.

Figure 7:
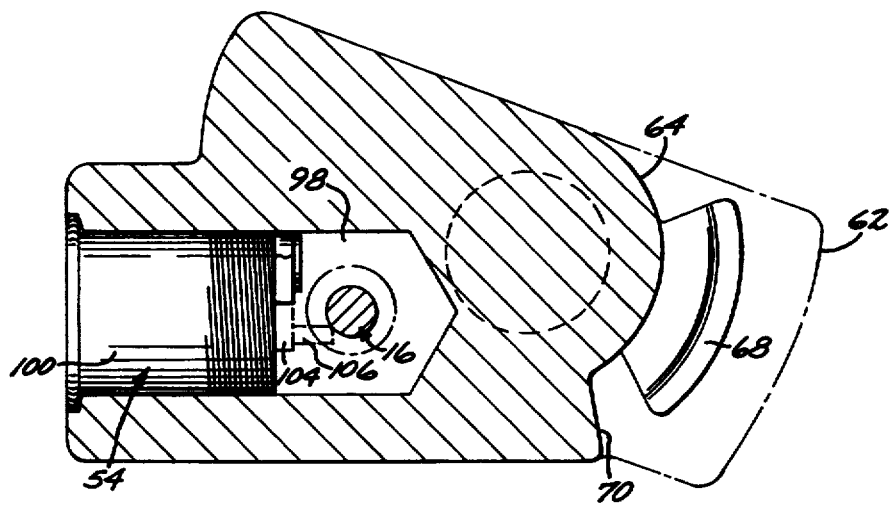
FIG. 7 is a horizontal sectional view of the gladhand locking apparatus taken along line 7—7 of FIG. 5.

Referring to FIGS. 2 and 3, the housing 60 is formed on the diametrical opposite side of the abutment surface 20 with a semi-cylindrical wall 64 disposed under the guard plate 62 and projecting parallel under such guard plate is a fan shaped clip 46 terminating in a semi-cylindrical end 66 having a semi-circular raised cam rail 68 formed on the top side thereof. A stop member 70 is formed at an edge of said semi-cylindrical wall 64 perpendicular to said guard plate as shown in FIG. 7. The cam rail 68 is inclined to define a ramp 72 (FIG. 3) to engage the underside of the retainer flange 42 of the gladhand 12 and, upon rotation of the body 14 onto such gladhand, draw the abutment surface downwardly into sealing engagement on the gasket 34 defining port 36. A dome 74 (FIG. 2) is formed on the abutment surface 20 to provide a positive sealing engagement with the gasket 34 defining port 36. The rail 68 and abutment surface 20 are configured and arranged such that the body 14 may be positioned with the abutment surface 20 overlying the gladhand gasket 34 defining port 36. Rotation of the locked device relative to the gladhand coupler 12 rotates such rail 68 on the clip into a downwardly opening indentation 76 while carrying the guard plate 62 into protective position, as shown in FIG. 3. A hook 78 is formed on an edge portion of the retainer 26 on a plane orthogonal to the abutment surface where the abutment skirt 48 and the retainer adjoin. The hook is brought down into contact with a curved semi-cylindrical end 80 of the gladhand 12 when the gladhand is rotatingly engaged into said gladhand locking body 14 as shown in FIG. 3.

Figure 5:
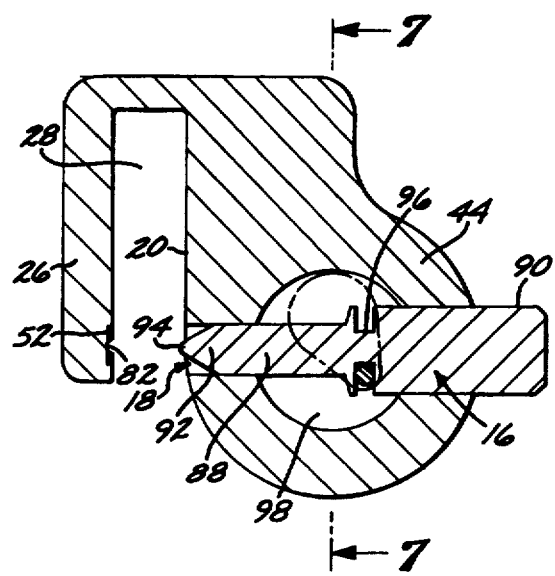
FIG. 5 is a cross-sectional view of the gladhand security locking apparatus taken along line 5—5 of FIG. 2 showing the keeper bolt in recessed position.
Figure 6:
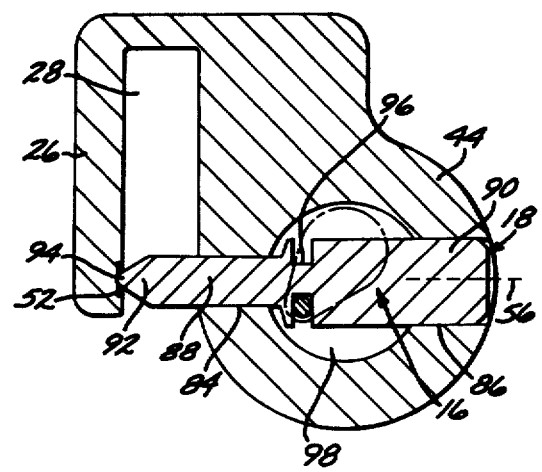
FIG. 6 is a cross-sectional view of the gladhand security locking apparatus taken along line 5—5 of FIG. 2 showing the keeper bolt in locked position.

Referring to FIGS. 5 and 6, the locking body is formed with a transverse stepped bore 18 opening at the abutment surface 20 in confronting relationship with the keeper pad 52 for telescopical receipt of the bolt 16. A conical detente 82 is formed in the pad 52 at a point directly opposite the keeper bolt receiving bore. The bore 18 is formed with a small diameter first bore segment 84 and on the diametrical opposite side of the barrel 44 with a larger diameter second bore segment 86 (FIG. 6).

The saw-resistant keeper bolt 16 acts to secure the tongue 30 in the tongue receiving bight 28 as shown in FIG. 4 and to secure the security lock apparatus to the gladhand. The bolt is stepped to form at one end a smaller diameter pintle 88 received telescopically in the bore 18 and an enlarged in diameter head 90 received in the bore, as shown in FIGS. 5 and 6. The pintle 88 is formed at its end with a conical point 92 forming an engagement tip 94. Formed centrally along the length of such bolt is an annular actuation groove 96.

The cylindrical barrel 44 of the body 14 defines a lock housing receiving bore 98 at an angle orthogonal to and intersecting the axis of the keeper bolt receiving bore 18, as shown in FIG. 6. Referring to FIG. 7, a lock housing 100 is received telescopically in the lock housing receiving bore 98 and includes a lock cylinder 102 (FIG. 1) that rotates within the lock housing 100. The lock cylinder 102 is rotatable upon insertion and rotation of an appropriate key. A master key may be used to lock the lock cylinder 102 into the lock housing 100 and to remove the lock cylinder therefrom (FIG. 1). This allows a previously used lock cylinder to be conveniently exchanged for a new lock cylinder. One end of the lock housing 100 confronts the keeper bolt 16 (FIG. 7). The lock cylinder includes an eccentric lobe 104, shown in FIG. 7, carried on an end of the lock cylinder and mounting a pin 106 which is floatingly engaged in the annular actuation groove 96 on the bolt 16 as shown in FIGS. 5 and 6. The keeper bolt 16 freely rotates within the bolt receiving bore 18, and may be made of case hardened steel polished to a smooth finish.

Rotation of the lock cylinder 102 in one direction, rotates the lobe 104 in the one direction to drive the bolt 16 in a direction towards a locked, engaged position as shown in FIG. 6 wherein the back end of head 90 of the bolt is retracted within the keeper bolt receiving bore 18 of barrel 44 and the tip 94 of the pintle 88 is buried beneath the surface of the keeper pad 52. When the lock cylinder 102 is rotated in the opposite direction it rotates the lobe 104 in the opposite direction which in turn drives the bolt 16 in a second direction opposite to such one direction towards an unlocked position as shown in FIG. 5, to retract the pintle 88.

In operation to secure and immobilize a tractor trailer, the gladhand locking apparatus 10 is attached by a user to the gladhand 12 by overlying the abutment surface dome 74 against the gladhand gasket 34 defining port 36. The locking apparatus may then be rotated to drive the clip 46 and rail 68 into position underneath the retainer flange 42 and to rotate the gladhand tongue 30 into the tongue receiving bight 28. The slope of the rail 68 will act as a ramp to drive the body downwardly to press the dome 74 against the gladhand port 34 to establish a positive sealing engagement. The lock housing 100 mounted in the body 14 of the locking apparatus is operable to extend the keeper bolt 16 perpendicularly therefrom to engage the conical indentation 82 formed on the keeper pad 52 of the retainer 26 and aligned opposite the bolt. The lock apparatus is rotated until the gladhand tongue 30 confronts the abutment skirt 48 and the retainer flange 42 confronts the stop member 70.

By turning a key in the lock cylinder 102, the bolt 16 is driven to engage the conical indentation 82. This locks the security apparatus capturing the tongue of the gladhand and securing the locking apparatus to the gladhand. The abutment skirt 48 on one side of the gladhand tongue and the bolt 16 on the opposite side protect the gladhand tongue from unauthorized access.

Should an unauthorized person attempt to gain access to the gladhand by drawing a hacksaw blade against the peripheral surface of the bolt, the freely rotating nature of the bolt will allow the bolt to rotate upon the power stroke of the hacksaw thereby preventing severance of such bolt.

Because the engagement tip 94 of the bolt is nested beneath the surface of the keeper pad 52 when locked, it is exceedingly difficult to gain access to the end of such bolt by a pry tool to pry the bolt away from the keeper pad. A pry tool cannot be forced underneath the engagement tip between the tip 94 and the pad 52 to obtain leverage against the bolt.

Authorized removal is easily accomplished with a key. A key is inserted into and rotates the lock cylinder 102. Rotation of the cylinder rotates the eccentric lobe 104 and the drive pin 106 formed thereon. Rotational movement of the drive pin causes telescopical movement of the bolt 16 away from the keeper pad 52 substantially retracting the pintle 88 of the bolt within the keeper bolt receiving bore 18, thus unlocking the security locking apparatus.

From the foregoing, it will be appreciated that the gladhand security lock apparatus of the present invention can be conveniently locked to a gladhand coupler to immobilize a tractor trailer and will serve to resist removal by an unauthorized person endeavoring to hacksaw through the keeper bolt.

Various modifications and changes may be made with regard to the foregoing detailed description without departing from the spirit and scope of the invention.

What is claimed is:

1. A gladhand security lock apparatus for coupling to a coupled position on a gladhand having a cylindrical body with a central port and a radially projecting tongue having first and second radially projecting ends, said apparatus comprising:

a body formed with an outwardly facing abutment surface for, when said body is mounted on said gladhand, overlying said port and a clevis wall projecting outwardly from one side of said abutment surface carrying on the distal end thereof a turned back retainer spaced from said abutment surface and cooperating therewith to form a tongue receiving bight for receipt of said tongue, an abutment wall at one end of said clevis wall to, when said apparatus is in said coupled position, engage said first radially projecting end of said tongue, said retainer including a keeper pad confronting said abutment surface and positioned to, when in said coupled position on said gladhand, be disposed adjacent to said radially projecting tongue, said body further being formed with a keeper bolt receiving bore opening in confronting relationship with said keeper pad, said body being further formed with a lock housing receiving bore orthogonal to and intersecting the axis of said keeper bolt receiving bore;

a saw resistant keeper bolt received freely rotatable in said keeper bolt receiving bore, said bolt being formed medially with an annular actuation groove and terminating on an end in an engagement tip aligned with said keeper pad;

a lock housing received in said lock housing bore, said housing including a lock cylinder rotatable within said housing and having one end disposed in confronting relation with said bolt, said lock cylinder including an eccentric lobe carried on said one end, a drive pin projecting axially from said lobe to be engaged in said actuation groove, said lock cylinder in said housing engaged with said lobe to, upon rotation thereof in one direction, orbit said lobe in said one direction to drive said bolt in one direction toward said keeper pad to a locked position engaging said tip with said keeper pad to hold said tongue captive between said bolt and said abutment wall and upon rotation of said lobe in the opposite direction to an unlocked position retracted clear of said tongue, said bolt being freely rotatable in said bolt receiving bore and said abutment surface and relative to said drive pin.

2. A gladhand security lock apparatus according to claim 1 wherein:
said keeper bolt is constructed of case hardened steel.

3. A gladhand security lock apparatus according to claim 1 wherein:
said body is formed with a barrel defining said lock housing receiving bore and formed with said keeper bolt receiving bore extending diametrically thereof, and formed adjacent said abutment surface with a small diameter first bore segment and on the diametrical opposite side of said barrel with a larger diameter second bore segment; and
said keeper bolt is formed with a relatively large diameter head received in said second bore segment and a relatively small pintle received in said first bore segment and terminating in said tip.

4. A gladhand security lock apparatus according to claim 3 wherein:
said bolt is constructed of case hardened steel.

5. A gladhand security lock apparatus according to claim 3 wherein:
said bolt is formed with a conical point terminating in said tip.

6. A gladhand security lock apparatus according to claim 3 wherein:
said pad is formed with a recess for receipt of said tip to block access thereunder by a pry tool.

7. A gladhand security lock apparatus according to claim 1 wherein:
said bolt is formed with a conical point confronting said keeper pad and terminating in said tip; and
wherein said keeper pad is formed with a recess for receipt of said tip to block access thereto by a pry tool.

8. A gladhand security lock apparatus according to claim 1 wherein:
said body is formed with a barrel defining said lock housing receiving bore, and formed with said keeper bolt receiving bore extending diametrically thereof, said keeper bolt receiving bore being formed adjacent said abutment surface with a first bore segment and on the diametrical opposite side of said barrel with a second bore segment; and
said bolt is formed with a head received in said second bore segment and a pintle received in said first bore segment, said head being of sufficient length to, when said bolt is in said unlocked position, project at least partially from said second bore segment externally of said barrel and to, when said bolt is in said locked position be received in said second bore segment fully retracted into the confines of said barrel.

9. A gladhand locking apparatus according to claim 1 wherein:
said body comprises peripheral hand grasp means for being grasped by a user's hand.

10. A gladhand security lock apparatus according to claim 9 wherein:
said keeper bolt is polished smooth.

11. A gladhand security lock apparatus according to claim 1 wherein:
said lock housing is constructed with a stop to restrict rotation of said lobe.

12. A gladhand security lock apparatus according to claim 1 comprising:
a guard plate projecting from said body and disposed in covering relation over a retainer flange of said gladhand.

13. A gladhand security lock apparatus according to claim 1 wherein:
said body comprises a closure housing, a planar guard plate formed at an extremity of said closure housing, a semi-cylindrical wall formed on said closure housing, and a clip extended from said semi-cylindrical wall spaced from and parallel to said guard plate.

14. A gladhand security lock apparatus for coupling to a coupled position on a gladhand housing a cylindrical body with a central port and a radially projecting tongue having first and second radially projecting ends, said apparatus comprising:
a body formed with an outwardly facing abutment surface for, when said body is mounted on said gladhand, overlying said port and a clevis wall projecting outwardly from one side of said abutment surface carrying on the distal end thereof a turned back retainer spaced from said abutment surface and cooperating therewith to form a tongue receiving bight for receipt of said tongue, an abutment skirt at one end of said clevis wall to, when said apparatus is in said coupled position, engage said first radially projecting end of said tongue, said retainer including a keeper pad confronting said abutment surface and positioned to, when in said coupled position on said gladhand, be disposed adjacent said radially projecting tongue, said body further being formed with a keeper bolt receiving bore opening in confronting relationship with said keeper pad, said body being further formed with a lock housing receiving bore orthogonal to and intersecting the axis of said keeper bolt receiving bore;
a saw resistant keeper bolt received freely rotatable in said keeper bolt receiving bore, said bolt being formed with an annular actuation groove and terminating on an end in an engagement tip aligned with said keeper pad;
a lock housing received in said lock housing bore, said housing including a lock cylinder rotatable within said housing and having one end disposed in confronting relation with said bolt, said lock cylinder including an eccentric lobe carried on said one end, a drive pin projecting axially from said lobe to be engaged in said actuation groove, said lock cylinder in said housing engaged with said lobe to, upon rotation thereof in one direction, orbit said lobe in said one direction to drive said bolt in one direction toward said keeper pad to engage said keeper pad to hold said tongue captive between said bolt and said abutment skirt, said bolt being freely rotatable in said keeper bolt receiving bore and said abutment surface and relative to said drive pin, said lock cylinder being operable upon rotation of said lock cylinder in a second direction to orbit said lobe to drive said bolt in a second direction away from said keeper pad toward a recessed position;
said body is formed with a barrel defining said lock housing receiving bore and formed with said keeper bolt receiving bore extending diametrically therethrough, said keeper bolt receiving bore being formed adjacent said abutment surface with a small diameter first bore segment and on the diametrical opposite side of said barrel with a larger diameter second bore segment; and said keeper bolt is formed with a relatively large diameter head received in said second bore segment and a relatively small pintle received in said first bore segment and terminating in said tip.

15. A gladhand security lock apparatus according to claim 14 wherein:

said head being in said second bore segment of sufficient length to, when said bolt is in an unlocked position, project at least partially from said keeper bolt receiving bore externally of said barrel and to, when said bolt is in a locked position be received in said second bore segment retracted into the confines of said barrel.

16. A gladhand security lock apparatus according to claim 14 wherein:

said bolt is constructed of case hardened steel and formed with a conical point terminating in said tip.

* * * * *